Patented June 19, 1934

1,963,165

UNITED STATES PATENT OFFICE 1,963,165

PROCESS OF AGING AND MATURING RAW ALCOHOLIC LIQUORS

Jacob Baer Gosch, New Rochelle, N. Y., assignor to Florida Cane Products Corporation, Miami, Fla., a corporation of Florida No Drawing. Application June 22, 1933, Serial No. 677,165

19 Claims. (Cl. 202—78)

The present invention relates to the treatment of alcoholic liquors, and more particularly to a process for aging and mellowing green or alcoholic liquors.

Green alcoholic liquors contain poisonous and disagreeably flavored compounds, including the fusel oils which it is necessary to remove in order to adapt the liquors for beverage or medicinal purposes. It is well known that raw alcoholic liquors in order to be used for beverage or medicinal purposes must be aged for a relatively long period of time in order to eliminate the poisonous components thereof.

The object of the present invention is to accelerate the aging of raw alcoholic liquors, and simultaneously produce a finished product suitable for beverage, medicinal and pharmaceutical purposes, said product having its poisonous impurities removed and having a flavor and mellowness comparable to naturally aged alcoholic liquors.

Broadly, the present invention comprises treating raw alcoholic liquors with a strong acid and an agent adapted to react with the acid and evolve oxygen therefrom, heating and maturing the so-treated liquor for a short period of time, preferably at an elevated temperature, then adding a bleaching and activity neutralizing agent, and then again maturing the alcoholic liquor for a long period of time, preferably at an elevated temperature. The process herein set forth produces a finished alcoholic product, no re-distilling being necessary.

In the preferred and most satisfactory form of the present invention, sulphuric acid is utilized in conjunction with a permanganate such as potassium permanganate.

In order to illustrate the present invention, the following specific example is set forth: about a pound and a quarter of potassium permanganate crystals are dissolved in an appropriate amount of water, for example three and one-half gallons. To this solution there is added about a pound of sulphuric acid, preferably concentrated sulphuric acid. The aqueous mixture resulting from mixing sulphuric acid and a water solution of potassium permanganate is added to the raw alcoholic liquor, preferably in the proportions of one pound of liquid to about fifty gallons of raw alcoholic liquor. The raw alcoholic liquor usually comes in charred barrels provided with a removable bung. In operating according to the present process, the bung is removed from the barrel and the aqueous mixture resulting from mixing sulphuric acid and potassium permanganate in solution is added to the contents of the barrel. Thereafter the bung is replaced and the barrel and its contents are allowed to mature for a short period of time at an elevated temperature. Rye and bourbon are allowed to mature for about three days at a temperature of 120° F., while rum and brandy are allowed to mature for about two days at the same temperature. It is of course obvious that the time of treatment and the temperature of treatment at this point of the process may be considerably varied and still come within the spirit of the present invention. In other words, it is not desired that the process be limited specifically to a temperature of 120° or to a maturing period at this point of two to three days. When using a lower temperature, for example 100° F., rye and bourbon can be allowed to mature for a period of five days, and rum and brandy for a period of four days. The important point is that after the treatment of the raw alcohol liquor with the treating solution there should be a short maturing period. The function of the elevated temperature is to accelerate the maturing period, and therefore, if the temperature is reduced, the maturing period at this point becomes longer and vice versa. If the temperature is increased above 120° F., the maturing period can be shortened. Of course, the upper temperature limit cannot be too high, since the treatment mixture at highly elevated temperatures would deteriorate the quality of the alcoholic liquor. Therefore, the upper temperature to which the treated alcoholic liquor may be subjected is defined as that temperature at which there is no appreciable deterioration of the quality of the alcoholic liquor. In general, it may be stated that it should not be above 140 or 150° F., and this of course will depend to a cerain extent upon the character and quality of the raw alcoholic liquor.

When the raw alcoholic liquor is treated with the aqueous solution resulting from mixing sulphuric acid and potassium permanganate, there is immediately set up in the liquor a substantial agitation, acting to eliminate the poisonous components of the fusel oils including the aldehydes and the higher alcohols while leaving the esters of the fusel oil to which the aromatic flavor of the liquor is due substantially unimpaired.

After the treated alcoholic liquor has been allowed to mature, as set forth above, the temporary bung is removed. When the bung is removed from the barrel, the chemical and physical action which the liquor is undergoing is very apparent. Immediately upon removal of the bung, there is an evolution of vapors and gases, these representing partial reaction products of the treatment process up to this point. A portion of the impurities present in the original raw liquor have been removed by virtue of the absorptive capacity of the porous lining of the barrel which, as stated, is also in a charred condition, thus augmenting the initial absorptive capacity of the porous wood of which the barrel is made. It is of course well known that the preferred material of the barrel is kiln dried oak, this having a relatively high absorptive capacity.

Immediately upon removing the temporary bung from the barrel, there is added to the treated alcoholic liquor an agent which will function to bleach and stop the chemical and physical activity taking place in the liquor which has been treated with the sulphuric acid and the permanganate mixture. While various agents may be used to effect the bleaching and the cessation of chemical and physical activity in the alcoholic liquor, it has been found that most satisfactory results are obtained by the addition of an oxygen evolving agent. While the preferred oxidizing agent is hydrogen peroxide, other compounds which are the chemical equivalents of hydrogen peroxide may be used. It has been found that the compound on the market under the trade name "Super Oxol" gives very satisfactory results. "Super Oxol" as put on the market is a 30% solution of hydrogen peroxide.

The amount of the bleaching and activity neutralizing agent which is added to the treated alcoholic liquor will of course vary with the character and quality of the initial raw product and with the amount of the sulphuric acid permanganate solution which has been initially added to the raw liquor. When adding the sulphuric acid permanganate treatment agent in the proportions above set forth to about fifty gallons of the raw liquor, it has been found that the addition of eight ounces of "Super Oxol", or 30% hydrogen peroxide, gives very satisfactory results. It is desired to point out that the amount of the bleaching and activity neutralizing agent may be considerably varied, and therefore the quantity above set forth is to be taken as illustrative and not by way of limitation. The important point is that the amount of "Super Oxol" added should be sufficient to bleach the liquor to a color corresponding to that of the liquor in its originally distilled condition, and further to cause the chemical and physical action in the alcoholic liquor to substantially cease.

After the addition of the bleaching and activity neutralizing agent, a permanent bung is inserted into the barrel and the treated alcoholic liquor allowed to further mature, preferably under an elevated temperature. The following maturing procedure has been found to give most satisfactory results. When maturing rum and brandy, the barrels of alcoholic liquor treated in accordance with the previous steps of the process are maintained in a warehouse having a temperature of about 120° F. for about three weeks. Thereafter, the temperature is reduced to about 100° F. for an additional week, and then to about 80° F. for another week. The warehouse or room in which the liquor is being matured under elevated temperature is then allowed to cool off to normal temperature which usually takes about a week or ten days, unless artificial means are used for cooling the temperature of the storage room. In general, this period of maturity varies from about six to eight weeks, and the resulting rum and brandy has reached full maturity, having a flavor and mellowness equivalent to rum and brandy which have been naturally aged for a period of approximately four years.

When rye and bourbon are treated, due to the higher content of impurities including fusel oils present in the raw alcoholic liquor, a longer period of maturing is necessary. When rye and bourbon have been treated, as above set forth, with the sulphuric acid potassium permanganate solution, and then later on after a short period of maturing treated with the bleaching and activity neutralizing agent, preferably Super Oxol, the so-treated material is subjected for a period of about two months to a temperature of about 120° F. The temperature of the storage room containing the barrels of treated liquor is then reduced to about 100° F. and the treated liquor allowed to mature for about an additional two months. Thereafter the temperature of the storage room is reduced to 80° for a period of one month. The storage room is then allowed to gradually cool off to about 70° F., it taking about one month under average conditions for the storage room to reach this temperature, although it is recognized that the cooling may be accomplished much quicker by artificial cooling means.

While the above maturing treatment for rye and bourbon gives the most satisfactory results, it is of course obvious that the temperature and also the time of treatment may be varied. The important point is that the alcoholic liquor, after being treated in accordance with the previous steps of the process, should be matured or aged at an elevated temperature for a sufficient period of time to confer upon the final product the properties of alcoholic liquors which have been naturally aged for a long period of time, much greater than herein set forth for the present invention. Those skilled in the art of treating alcoholic liquors will know how to vary the time and temperature of treatment in accordance with the physical and chemical characteristics of the initial starting material. The alcoholic liquors, and particularly rum, brandy, rye and bourbon, when treated in accordance with the present process, do not require any redistilling. After the final maturing step, the product has properties comparable to alcoholic liquors which have been naturally aged for four years or longer, and is fully equivalent from the standpoint of flavor and mellowness to alcoholic liquors which have been aged by the old natural aging method.

In either of the maturing steps herein set forth the temperature of the storage room is thermostatically maintained and any method of maintaining the temperature of the heated storage room may be used. Preferably, heated air is circulated through the heated room by a blower system, and the blowers are preferably located at diametrically opposite points of the room. Of course, the temperature of the room will vary within a few degrees from the top racks to the bottom racks, and therefore, it is desirable in order to equalize the temperature treatment of the alcoholic liquor to shift the barrels in the top rack at appropriate intervals to the bottom racks, thereby maintaining approximately an even temperature to which all the barrels are subjected.

In the preferred form of the present invention raw alcoholic liquor is treated with an acid, preferably sulphuric acid, since this acid has been found to give the most satisfactory results. However, it is desired to point out that the chemical equivalent of the acid, and also of the potassium permanganate may be used. Any acid which will act in conjunction with an oxidizing agent to remove the poisonous ingredients of the fusel oils may be used, although a strong acid such as sulphuric acid is preferred. Instead of using potassium permanganate, sodium permanganate may be used. Compounds of a similar character which act as oxidizing agents are the perchromates, perchlorates, and perborates.

Broadly stated, the present invention is directed to a process of maturing and aging raw alcoholic liquor to produce in a short period of time a liquor comparable in taste, flavor and mellowness to naturally long-time aged alcohlic liquor, and this is accomplished by removing the poisonous ingredients of the fusel oils present in the liquor and aging the so-treated liquor for a time period substantially less than that required for natural aging. Preferably, final aging is carried out in successive steps at relatively high or elevated temperature, the time and temperature of each successive step being less than the preceding one. After the liquor is treated with the acid and the material evolving oxygen, it is preliminarily aged for a relatively short period of time, while allowing the oxygen to permit chemical and physical activity in the liquor. There is thereafter added to the preliminarily aged liquor the activity neutralizing and bleaching agent.

What I claim is:

1. The process of maturing and aging raw alcoholic liquors to produce in a short period of time potable liquor comparable in taste, flavor and mellowness to naturally long-time aged alcoholic liquor, comprising treating the alcoholic liquor with a material evolving oxygen, preliminarily aging the so-treated liquor for a relatively short period of time while allowing the oxygen to promote chemical and physical activity in the liquor, adding to the preliminarily aged liquor an activity neutralizing and bleaching agent in a quantity sufficient to substantially inhibit the chemical activity, and then again aging, the time period for the complete aging of the alcoholic liquor being substantially less than that required for natural aging.

2. The process of maturing and aging raw alcoholic liquors to produce in a short period of time a potable liquor comparable in taste, flavor and mellowness to naturally long-time aged alcoholic liquor comprising treating the liquor with a mixture of a strong acid and an oxygen evolving compound, preliminarily aging the so-treated liquor at an elevated temperature for a relatively short period of time while allowing the treatment mixture to promote chemical and physical activity in the liquor, adding to the preliminarily aged liquor an activity neutralizing and bleaching agent in a quantity sufficient to substantially inhibit the chemical activity, and then again aging, the time period for the complete aging of the alcoholic liquor being substantially less than that required for natural aging.

3. The process of maturing and aging raw alcoholic liquors to produce in a short period of time a potable liquor comparable in taste, flavor and mellowness to naturally long-time aged alcoholic liquor comprising treating the liquor with a mixture of a strong acid and an oxygen evolving compound, preliminarily aging the so-treated liquor at an elevated temperature for a relatively short period of time while allowing the treatment mixture to promote chemical and physical activity in the liquor, adding to the preliminarily aged liquor an activity neutralizing and bleaching agent in a quantity sufficient to substantially inhibit the chemical activity, and then again aging in successive steps at relatively high temperatures, the time and temperature of each successive step being less than the preceding one.

4. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and an oxygen evolving compound, preliminarily aging the so-treated liquor at an elevated temperature for a relatively short period of time while allowing the treatment mixture to promote chemical and physical activity in the liquor, adding to the preliminarily aged liquor an activity neutralizing and bleaching agent in a quantity sufficient to substantially inhibit the chemical activity, and then again aging, the time period for the complete aging of the alcoholic liquor being substantially less than that required for natural aging.

5. The process of maturing and aging raw alcoholic liquors to produce in a short period of time a potable liquor comparable in taste, flavor and mellowness to naturally long-time aged alcoholic liquors, comprising treating the liquor with a mixture of sulphuric acid and an oxygen evolving compound, preliminarily aging the so-treated liquor at an elevated temperature for a relatively short period of time while allowing the treatment mixture to promote chemical and physical activity in the liquor, adding to the preliminarily aged liquor an activity neutralizing and bleaching agent in a quantity sufficient to substantially inhibit the chemical activity, and then again aging in successive steps at relatively high temperatures, the time and temperature of each successive step being less than the preceding one.

6. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, preliminarily aging the so-treated liquor while allowing the chemical and physical activity induced by said mixture to proceed, adding to the preliminarily aged liquor an activity neutralizing and bleaching agent in a quantity sufficient to substantially inhibit the chemical activity, and then again aging, the time period for the complete aging of the alcoholic liquor being substantially less than that required for natural aging.

7. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, preliminarily aging the so-treated liquor while allowing the chemical and physical activity induced by said mixture to proceed, adding to the preliminarily aged liquor an activity neutralizing and bleaching agent in a quantity sufficient to substantially inhibit the chemical activity, and then again aging in successive steps at relatively high temperatures, the time and temperature of each successive step being less than the preceding one, the time period for the complete aging of the alcoholic liquor being substantially less than that required for natural aging.

8. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, maintaining the so-treated liquor in a charred vessel and in a heated state for a period of time insufficient to deteriorate the essential properties of the liquor while allowing the chemical and physical activity induced by said mixture to proceed, adding to the preliminarily aged liquor an activity neutralizing and bleaching agent in a quantity sufficient to substantially inhibit the chemical activity, and then again aging, the time period for the complete aging of the alcoholic liquor being substantially less than that required for natural maturing and aging.

9. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, maintaining the so-treated liquor in a charred vessel and in a heated state for a period of time insufficient to deteriorate the essential properties of the liquor while allowing the chemical and physical activity induced by said mixture to proceed, adding to the preliminarily aged liquor an activity neutralizing and bleaching agent in a quantity sufficient to substantially inhibit the chemical activity, and then again aging in successive steps at relatively high temperatures, the time and temperature of each successive step being less than the preceding one, the time period for the complete aging of the alcoholic liquor being substantially less than that required for natural aging.

10. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, maintaining the so-treated liquor in a charred vessel and in a heated state for a time insufficient to deteriorate the essential properties of the liquor while allowing the chemical and physical activity induced by said mixture to proceed, adding to the preliminarily aged liquor an oxygen generating activity neutralizing and bleaching agent in a quantity sufficient to substantially inhibit the chemical activity, and then again aging, the time period for the complete aging of the alcoholic liquor being substantially less than that required for natural aging.

11. The process of maturing and aging raw alcoholic liquors to produce in a short period of time a potable liquor comparable in taste, flavor and mellowness to naturally long-time aged alcoholic liquor comprising treating the liquor with a mixture of sulphuric acid and potassium permanganate, maintaining the so-treated liquor in a charred vessel and in a heated state for a period of time insufficient to deteriorate the essential properties of the liquor while allowing the chemical and physical activity induced by said mixture to proceed, adding to the preliminarily aged liquor a solution of hydrogen peroxide in a quantity sufficient to substantially inhibit the chemical activity of the liquor, and then again aging, the time period for the complete aging of the alcoholic liquor being substantially less than that required for natural aging.

12. The process of maturing and aging raw alcoholic liquors to produce in a short period of time a potable liquor comparable in taste, flavor and mellowness to naturally long-time aged alcoholic liquor, comprising treating the liquor with a mixture of sulphuric acid and potassium permanganate in a quantity sufficient to react with the harmful ingredients of the fusel oils present in the liquor and to assist in their elimination, maintaining the so-treated liquor in a charred vessel for a period of time varying between two and three days and at a temperature varying approximately between 120° F. and 150° F., while allowing the chemical and physical activity induced by said mixture to proceed, thereby preliminarily aging the liquor, adding to the preliminarily aged liquor a solution of hydrogen peroxide in a quantity sufficient to substantially inhibit the chemical activity of the liquor, and then aging in successive steps at relatively high temperatures incapable of causing any appreciable deterioration of the quality of the liquor, the time and temperature of each successive step being less than the preceding one, the time for the complete aging of the alcoholic liquor being substantially less than that required for natural aging.

13. The process of maturing and aging raw alcoholic liquors of the group consisting of rum and brandy to produce in a short period of time a potable liquor comparable in taste, flavor and mellowness to naturally long-time aged alcoholic liquor, comprising treating the liquor with a mixture of sulphuric acid and potassium permanganate in a quantity sufficient to react with the harmful ingredients of the fusel oils present in the liquor and to assist in their elimination, maintaining the so-treated liquor in a charred vessel for a period varying between two and three days and at a temperature varying approximately between 100° F. and 150° F. while allowing the chemical and physical activity induced by said mixture to proceed, thereby preliminarily aging the liquor, adding to the preliminarily aged liquor a solution of hydrogen peroxide in a quantity sufficient to substantially inhibit the chemical activity of the liquor, and then aging in successive steps, the time and temperature of the first step being about three weeks and 120° F. respectively, the time and temperature of the second step being about one week and 100° F. respectively, the time and temperature of the third step being about one week and 80° F., and the time of the fourth step being about a week to ten days and the temperature varying between 80° F. and normal room temperature.

14. The process of maturing and aging raw alcoholic liquors of the group consisting of rye and bourbon to produce in a short period of time a potable liquor comparable in taste, flavor and mellowness to naturally long-time aged alcoholic liquor, comprising treating the liquor with a mixture of sulphuric acid and potassium permanganate in a quantity sufficient to react with the harmful ingredients of the fusel oils present in the liquor and to assist in their elimination, maintaining the so-treated liquor in a charred vessel for a period varying between two and three days and at a temperature varying approximately between 100° F. and 150° F. while allowing the chemical and physical activity induced by said mixture to proceed, thereby preliminarily aging the liquor, adding to the preliminarily aged liquor a solution of hydrogen peroxide in a quantity sufficient to substantially inhibit the chemical activity of the liquor, and then aging in successive steps, the time and temperature of the first step being about two months and 120° F. respectively, the time and temperature of the second step being about two months and about 100 F., respectively, the time and temperature of the third step being about one month and 80° F. respectively, and the time of the fourth step being about a month and the temperature varying between 80° and normal room temperature.

15. The process of maturing and aging raw alcoholic liquors to produce in a short period of time a potable liquor comparable in taste, flavor and mellowness to naturally long-time aged alcoholic liquor comprising dissolving about a pound and a quarter of potassium permanganate crystals in about three and one-half gallons of water, adding thereto about one pound of concentrated sulphuric acid, mixing about one pound of the resulting liquor with about fifty gallons of raw alcoholic liquor, maintaining the so-treated liquor in a charred vessel for a period of time varying between two and three days and at a temperature between 120° and 150° F. while allowing the chemical and physical activity induced by the treatment mixture to proceed, thereby preliminarily aging the liquor, adding to the preliminarily aged liquor about eight ounces of a 30% solution of hydrogen peroxide, and then aging in successive steps at relatively high temperatures, the time and treatment of each successive step being less than the preceding one.

16. The process of maturing and aging raw alcoholic liquors of the group consisting of rum and brandy, to produce in a short period of time a potable liquor comparable in taste, flavor and mellowness to naturally long-time aged alcoholic liquor comprising dissolving about a pound and a quarter of potassium permanganate crystals in about three and one-half gallons of water, adding thereto about one pound of concentrated sulphuric acid, mixing about one pound of the resulting liquor with about fifty gallons of raw alcoholic liquor, maintaining the so-treated liquor in a charred vessel for a period of time varying between two and three days and at a temperature between 120° and 150° while allowing the chemical and physical activity induced by the treatment mixture to proceed, thereby preliminarily aging the liquor, adding to the preliminarily aged liquor about eight ounces of a 30% solution of hydrogen peroxide, and then aging in successive steps, the time and temperature of the first step being about three weeks and 120° F. respectively, the time and temperature of the second step being about one week and 100° F. respectively, the time and temperature of the third step being about one week and 80° F., and the time of the fourth step being about a week to ten days, and the temperature varying between 80° F. and normal room temperature.

17. The process of maturing and aging raw alcoholic liquors of the group consisting of rye and bourbon, to produce in a short period of time a potable liquor comparable in taste, flavor and mellowness to naturally long-time aged alcoholic liquor comprising dissolving about a pound and a quarter of potassium permanganate crystals in about three and one-half gallons of water, adding thereto about one pound of concentrated sulphuric acid, mixing about one pound of the resulting liquor with about fifty gallons of raw alcoholic liquor, maintaining the so-treated liquor in a charred vessel for a period of time varying between two and three days and at a temperature between 120° and 150° F. while allowing the chemical and physical activity induced by the treatment mixture to proceed, thereby preliminarily aging the liquor, adding to the preliminarily aged liquor about eight ounces of a 30% solution of hydrogen peroxide, and then aging in successive steps, the time and temperature of the first step being about two months and 120° F. respectively, the time and temperature of the second step being about two months and about 100° F. respectively, the time and temperature of the third step being about one month and 80° F. respectively, and the time of the fourth step being about a month and the temperature varying between 80° and normal room temperature.

18. The process of maturing and aging raw alcoholic liquors of the group consisting of rum and brandy to produce in a short period of time a potable liquor comparable in taste, flavor and mellowness to naturally long-time aged alcoholic liquor, comprising treating the liquor with a material evolving oxygen in a quantity sufficient to react with the harmful ingredients of the fusel oils present in the liquor and to assist in their elimination, preliminarily aging the so-treated liquor for a relatively short period of time while allowing the oxygen to promote chemical and physical activity in the liquor, adding to the preliminarily aged liquor an activity neutralizing and bleaching agent in a quantity sufficient to substantially inhibit the chemical activity, and then aging in successive steps, the time and temperature of the first step being about three weeks and about 120° F. respectively, the time and temperature of the second step being about one week and 100° F. respectively, the time and temperature of the third step being about one week and 80° F., and the time of the fourth step being about a week to ten days and the temperature varying between 80° F. and normal room temperature.

19. The process of maturing and aging raw alcoholic liquors, of the group consisting of rye and bourbon to produce in a short period of time a liquor comparable in taste, flavor and mellowness to naturally long-time aged alcoholic liquor, comprising treating the liquor with a mixture of sulphuric acid and potassium permanganate in a quantity sufficient to react with the harmful ingredients of the fusel oils present in the liquor and to assist in their elimination, maintaining the so-treated liquor in a charred vessel for a period varying between two and three days and at a temperature varying approximately between 100° F. and 150° F. while allowing the chemical and physical activity induced by said mixture to proceed, thereby preliminarily aging the liquor, adding to the preliminarily aged liquor a solution of hydrogen peroxide in a quantity sufficient to substantially inhibit the chemical activity of the liquor, and then aging in successive steps, the time and temperature of the first step being about two months and 120° F. respectively, the time and temperature of the second step being about two months and about 100° F. respectively, the time and temperature of the third step being about one month and 80° F. respectively, and the time of the fourth step being about a month and the temperature varying between 80° and normal room temperature.

JACOB BAER GOSCH.